United States Patent
Kurahashi et al.

(10) Patent No.: US 6,307,176 B1
(45) Date of Patent: Oct. 23, 2001

(54) LIGHT BEAM HEATING APPARATUS

(75) Inventors: Shinsuke Kurahashi, Hyogo; Nobuyuki Haji, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/412,617

(22) Filed: Oct. 6, 1999

(30) Foreign Application Priority Data

Oct. 13, 1998 (JP) .................................................. 10-290330

(51) Int. Cl.$^7$ .................................................. B23K 26/06
(52) U.S. Cl. .................. 219/121.75; 219/85.12; 219/121.73
(58) Field of Search ............................ 219/85.12, 121.73, 219/121.75; 385/33

(56) References Cited

U.S. PATENT DOCUMENTS

| | | | |
|---|---|---|---|
| 4,398,790 | * | 8/1983 | Righini et al. . |
| 4,435,049 | * | 3/1984 | Horikawa et al. . |
| 4,695,697 | * | 9/1987 | Kosa . |
| 4,960,972 | | 10/1990 | Nakamura et al. ................ 219/85.12 |
| 5,037,174 | * | 8/1991 | Thompson . |
| 5,235,464 | * | 8/1993 | Tsachida . |
| 5,285,318 | * | 2/1994 | Gleckman . |
| 5,335,309 | | 8/1994 | Fujii et al. ........................ 219/85.12 |
| 5,764,838 | * | 6/1998 | Kubo et al. ............................. 385/33 |
| 5,852,508 | * | 12/1998 | Kubota et al. . |
| 5,859,868 | * | 1/1999 | Kyusho et al. . |

FOREIGN PATENT DOCUMENTS

4234342 * 5/1998 (DE) .

* cited by examiner

*Primary Examiner*—Geoffrey S. Evans
(74) *Attorney, Agent, or Firm*—Wenderoth, Lind & Ponack L.L.P.

(57) ABSTRACT

A light beam heating apparatus having a condensing lens mechanism including an aspherical lens and a spherical lens disposed in a light path. The light beam heating apparatus also includes a light source and a light path which transmits the light beam irradiated from the light source, to an object to be heated. The light beam is transmitted through an optical fiber along part the light path, and the aspherical lens and spherical lens are disposed on the optical fiber side and on the object-to-be-heated side respectively. The above-described construction functions to suppress lateral aberration when the diameter of an optical fiber in use is changed, thereby preventing deterioration of the imaging capacity. Also, the occurrence of chromatic aberration can be suppressed to a minimum. Thus, energy concentration in the light condensing section can be improved.

7 Claims, 2 Drawing Sheets

FIG. 1
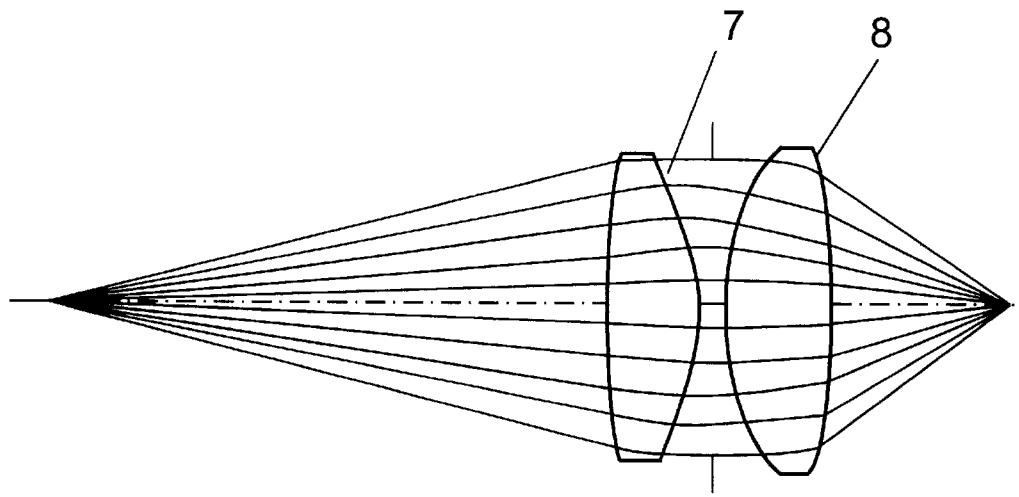
FIG. 2 - PRIOR ART
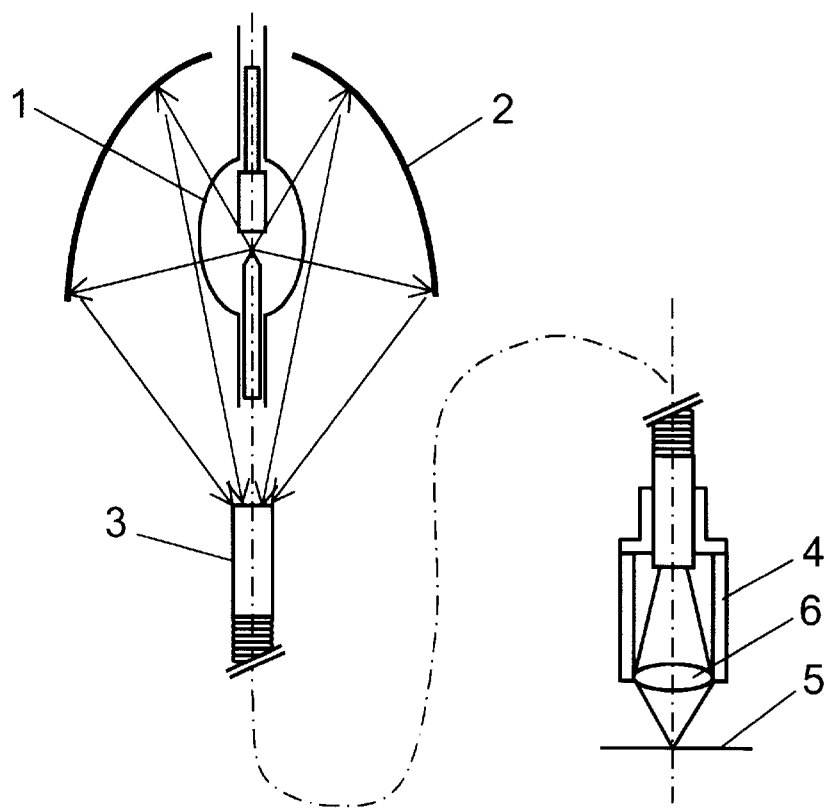

FIG. 3 - PRIOR ART
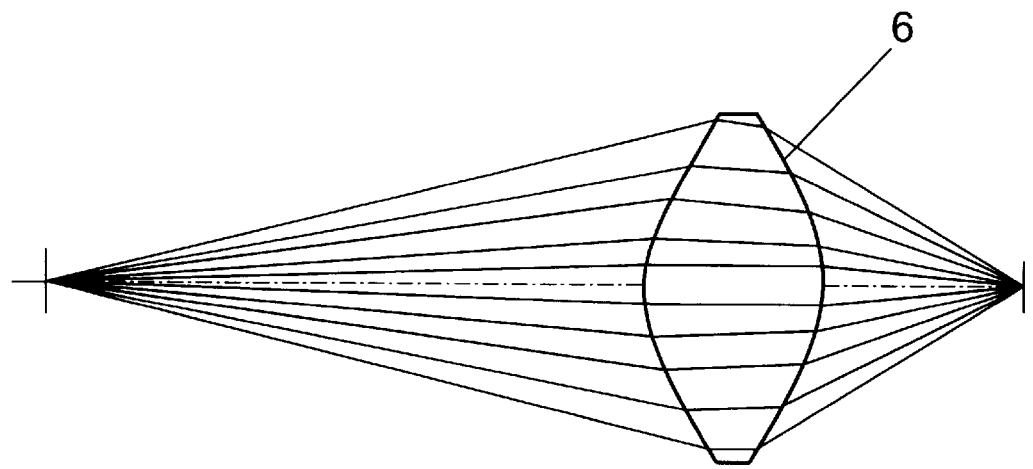
FIG. 4
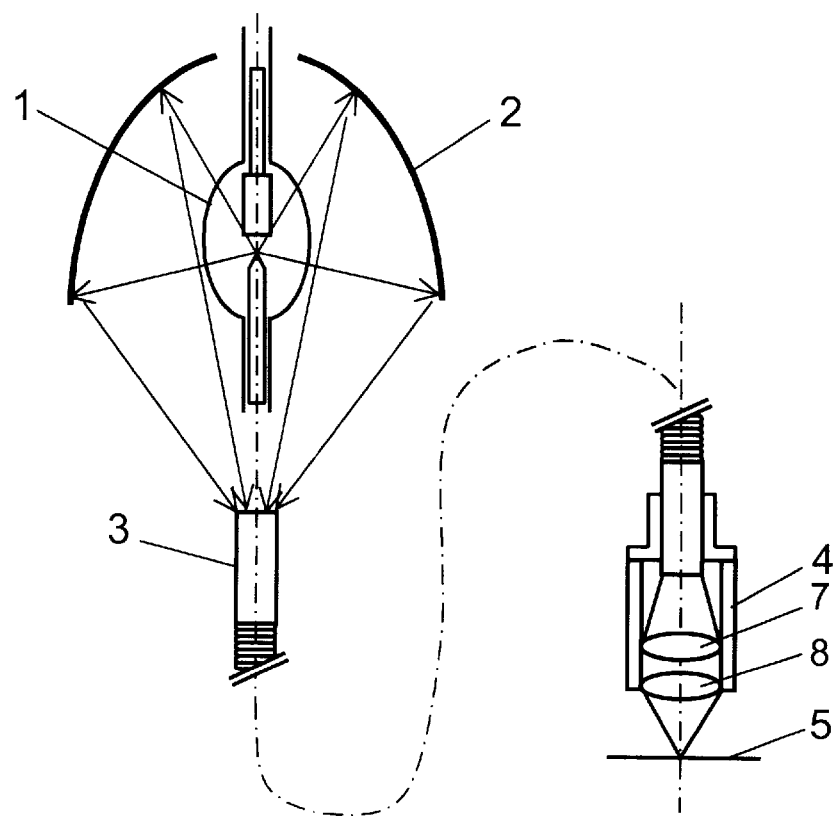

LIGHT BEAM HEATING APPARATUS

BACKGROUND OF THE INVENTION

1. Field of the Invention

The present invention relates to a light beam heating apparatus to be used as a local non-contact heating source for soldering electronic components.

2. Description of Related Art

FIG. 2 shows an optical system structure of a conventional light beam heating apparatus.

The principle of the light beam heating apparatus is described below. A bright point of a light source 1 and an incident edge face of a bundled optical fiber 3 are disposed on the first and second focal points of a condensing mirror 2, respectively. A light beam irradiated from the light source 1 is condensed on the second focal point by the condensing mirror 2 and enters the bundled optical fiber 3. The light beam, entered into the bundled optical fiber 3, is transmitted through the optical fiber and irradiated from an irradiation edge face. The light beam irradiated from the irradiation edge face is condensed, by a condensing lens mechanism 4, into a light beam having a predetermined diameter and reaching a light irradiated section 5.

With regard to the condensing lens mechanism, FIG. 3 shows the construction of a conventional condensing lens. As shown in FIG. 3, the conventional condensing lens is constructed with a single aspherical lens 6. The aspherical lens 6 is designed to condense light in the most preferable manner for a predeteremined wavelength of light and beam magnification (diameter of a condensed beam/diameter of a bundled optical fiber).

However, the conventional condensing lens mechanism 4 has a problem of declining imaging capacity caused by increasing lateral aberration which occurs with changes in the wavelength of light and beam magnification. Furthermore, when the wavelength of the light irradiated from the light source 1 is relatively wide, as is the case with xenon light, deviation in imaging position occurs due to chromatic aberration. These problems cause dispersion of the energy depending on the wavelength, leading to a failure of the condensed beam to form an image clearly, and resulting in lower energy concentration at the light condensing section.

The construction, which includes a single aspherical lens 6, has difficulty condensing light while suppressing lateral and chromatic aberration at each magnification.

The present invention aims to provide a construction of a condensing lens which solves the foregoing problems.

SUMMARY OF THE INVENTION

The light beam heating apparatus of the present invention has a condensing lens mechanism comprising an aspherical lens and a spherical lens, which function to suppress an increase of lateral aberration and the occurrence of chromatic aberration of the incident light to a minimum.

The light beam heating apparatus of the present invention uses an optical fiber for part of the light path. With regard to the condensing lens mechanism, the aspherical lens and spherical lens are disposed on the optical fiber side and on the other side of the light path, where the object to be heated is placed, respectively.

With the construction mentioned above, increased lateral aberration can be suppressed even when the wavelength and beam magnification are different with respect to the predetermined level, thereby preventing the imaging capacity from declining. The occurrence of the chromatic aberration can also be suppressed. Thus, energy concentration in the light condensing section can be improved.

BRIEF DESCRIPTION OF THE DRAWINGS

FIG. 1 shows a schematic view of the condensing lens mechanism constructed in accordance with a preferred embodiment of the present invention.

FIG. 2 shows a block diagram of a conventional light beam heating apparatus.

FIG. 3 shows a light path of a conventional condensing lens.

FIG. 4 shows a block diagram of a light beam heating apparatus in accordance with a preferred embodiment of the present invention.

DETAILED DESCRIPTION OF THE INVENTION

A preferred embodiment of the present invention is described hereinafter.

With regard to the construction of the present invention, all of the parts, with the exception of a condensing lens mechanism, have the same construction as in the conventional construction shown in FIG. 2. Therefore, description of such construction is omitted. The condensing lens mechanism of the preferred embodiment of the present invention is described below with reference to FIG. 1.

As shown in FIG. 1, in the condensing lens mechanism of the present invention, an aspherical lens 7 is disposed on a bundled optical fiber 3 side and a spherical lens 8 is disposed on the side of a light irradiated section 5.

The function of the preferred embodiment is described below. As shown in FIG. 4, the aspherical lens 7 leads a light beam irradiated from the bundled optical fiber 3 into the spherical lens 8, after bending the light beam close to parallel to the light axis while suppressing any increase in lateral aberration. The spherical lens 8 condenses the light beam irradiated from the aspherical lens 7 while suppressing chromatic aberration to a minimum. As described above, the condensing lens mechanism of the present invention assigns the task of compensating the lateral aberration and chromatic aberration to the aspherical lens 7 and the spherical lens 8, respectively. The construction of the present invention allows both compensation of lateral aberration rise and compensation of light condensing and chromatic aberration associated with changes in beam magnification, which have been impossible in the conventional apparatuses.

According to this embodiment, lateral aberration can be suppressed even when the wavelength and beam magnification are different relative to a predetermined level, thereby preventing the imaging capacity from declining. The occurrence of chromatic aberration can also be suppressed. Thus, energy concentration at the light condensing section can be improved.

In this embodiment, a xenon lamp is used as a light source 1. However, other light sources such as a semiconductor laser or other laser beams can be used as well. In such cases, a condensing mirror 2 does not have to be used.

As the above description makes clear, according to the present invention, increases in lateral aberration can be suppressed and the lowering of the imaging capacity can be prevented even when the wavelength of the light source and the beam magnification of the fiber and lens combination differ from predetermined levels. The occurrence of chromatic aberration can also be suppressed to a minimum, which in turn allows an improvement in energy concentration at the light condensing section. Improvement in the energy concentration at the light condensing section permits the heating time for soldering to be shortened, when soldering is carried out at the light irradiated section.

What is claimed is:

1. A light beam heating apparatus comprising:
    a light source;
    a light path; and
    a condensing lens mechanism comprising an aspherical lens and a spherical lens disposed in said light path, wherein an optical fiber is used in a part of said light path and said aspherical lens is disposed on the optical fiber side of said condensing lens mechanism and said spherical lens is disposed on the other side of said condensing lens mechanism where an object to be heated is to be placed.

2. The light beam heating apparatus as claimed in claim 1, wherein said aspherical lens suppresses lateral aberration of the incident light and said spherical lens suppresses chromatic aberration of the incident light.

3. The light beam heating apparatus as claimed in claim 1, wherein said light source is a laser beam.

4. The light beam heating apparatus as claimed in claim 1, wherein said light source is a semiconductor laser.

5. A light beam heating apparatus comprising:
    a light source;
    an optical fiber for receiving a light beam irradiated from said light source; and
    a condensing lens mechanism for condensing a light beam emitted from said optical fiber,
    said condensing lens mechanism including an aspherical lens and a spherical lens, wherein said aspherical lens is positioned so as to direct the light beam emitted from said optical fiber into said spherical lens.

6. The light beam heating apparatus as claimed in claim 5, wherein said light source is a laser beam.

7. The light beam heating apparatus as claimed in claim 5, wherein said light source is a semiconductor laser.

* * * * *